United States Patent [19]
Brauhut

[11] 3,744,541
[45] July 10, 1973

[54] WALLET

[76] Inventor: Harold N. Brauhut, c/o Honey Toy Industries, Inc., 200 Fifth Avenue, New York, N.Y. 10010

[22] Filed: Dec. 22, 1971

[21] Appl. No.: 211,027

[52] U.S. Cl.................... 150/35, 150/34, 150/28 R, 272/8 N, 281/31
[51] Int. Cl. ............................................ A63j 23/00
[58] Field of Search .................. 150/30, 34, 35, 37, 150/38, 39; 272/8 N; 281/31

[56] References Cited
UNITED STATES PATENTS

| | | | |
|---|---|---|---|
| 2,303,248 | 11/1942 | Allen | 281/31 |
| 2,369,864 | 2/1945 | Spaldo | 150/35 UX |
| 2,400,982 | 5/1946 | Dobrin | 272/8 N |
| 2,527,059 | 10/1950 | DiMezza | 150/35 |

Primary Examiner—Donald F. Norton
Attorney—Abraham Friedman and Abraham Goodman et al.

[57] ABSTRACT

A wallet for confining visual intelligence and permitting secret observation of the latter during confinement, said wallet including a pair of pockets for removably receiving opposite portions of a book binding-cover, and a pair of partially transparent pockets overlying the first said pockets respectively for receiving visual intelligence, one of the pockets for receiving an associated portion of the binding-cover including a louvered array of transparent and opaque zones extending in alternate succession for permitting limited observation of said visual intelligence when said book binding-cover is removed therefrom.

10 Claims, 9 Drawing Figures

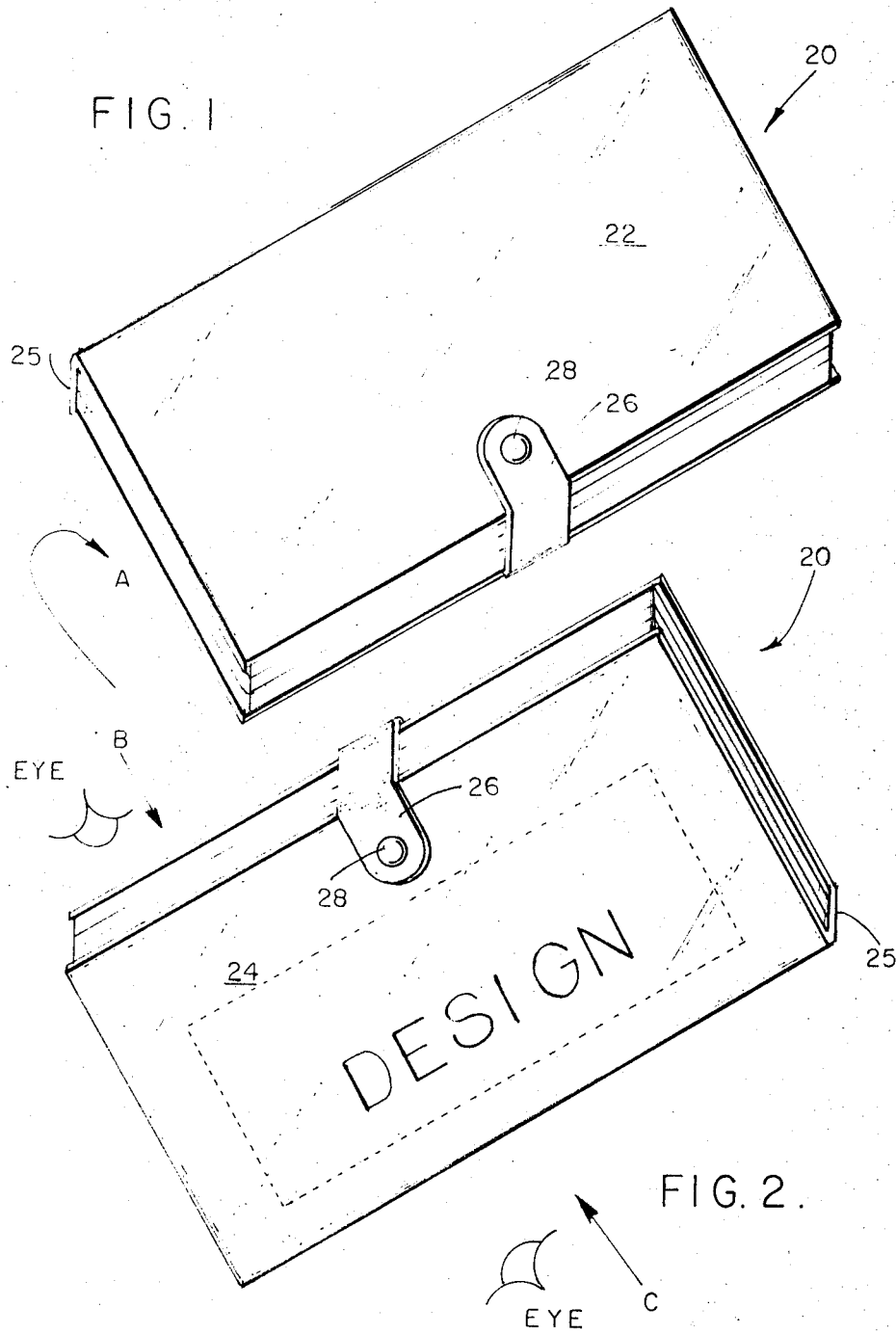

WALLET

BACKGROUND OF THE INVENTION

The present invention relates generally to devices which permit simulation of mind-reading, and more particularly to a device for secretly observing visual intelligence.

The art of mind-reading generally employs various methods and devices for predetermining or accumulating information from a subject so as to, thereafter, inform the subject of the information, in a manner simulating mind-reading, without the subject having been aware that the information had first been taken from him. For example, the information may have first been obtained through interviews, or the like, in which the subject was not told of the reason for imparting such information, or the subject may have first recorded written information upon a paper superposed upon a pad, or the like, the pad simultaneously being formed with imprints or impressions of the recorded written information.

Other devices such as a hidden or concealed mirror for secretly viewing intelligence possessed by the subject are often utilized likewise. Or, by employing subtleties, such as the use of fingernail-writers or scribes, one may secretly write the correct information after it has been given under the pretence that it was duplicated beforehand; or, the forcing of predetermined information such as a page number in a book or a certain playing card seemingly chosen at random, and the practice of switching or exchanging the paper or material containing the information for a like or substitute article, which would appear to be the original, enables the mind-reader to obtain the secret information supposedly in the possession of his subject. Clearly, these devices or methods of obtaining or predetermining information from a subject so as to permit a simulation of mind-reading or a display of what is commonly known as Extra-Sensory-Perception, are often less than most reliable since, in fact, most of the methods commonly used, have been exposed from time to time by investigators who have published or otherwise revealed the methods used, and many subjects are either aware or suspicious of the manner by which the information was obtained.

SUMMARY OF THE INVENTION

Accordingly, it is an object of the present invention to provide a device for secretly observing visual intelligence while under constant scrutiny at all times to obviate the use of an auxiliary or trickster device or ploys for relaying the intelligence, the latter appearing concealed and capable of remaining in the possession of the subject at all times.

It is another object of the present invention to provide a wallet for secretly observing visual intelligence which, when examined by a subject, will impart an appearance of complete opacity, yet which is at least partially transparent for permitting the observation of recorded information in a preferred direction, which information is concealed in a counter-direction insofar as the subject is concerned.

To this end, the present invention generally relates to a wallet for confining visual intelligence and permitting secret observation of the latter during confinement, said wallet including a pair of pockets for removably receiving opposite portions of a book binding-cover, and a pair of partially transparent pockets overlying the first said pockets respectively for receiving visual intelligence, one of the pockets for receiving an associated portion of the binding-cover including a louvered array of transparent and opaque zones extending in alternate succession for permitting limited observation of said visual intelligence when said book binding-cover is removed therefrom.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 1 illustrates a perspective view of the wallet pursuant to the present invention in a closed condition;

FIG. 2 illustrates a perspective view similar to that of FIG. 1, but showing the opposite side of the wallet as flipped over in a direction of arrow A in FIG. 1;

DETAILED DESCRIPTION OF THE INVENTION

Figure 3:
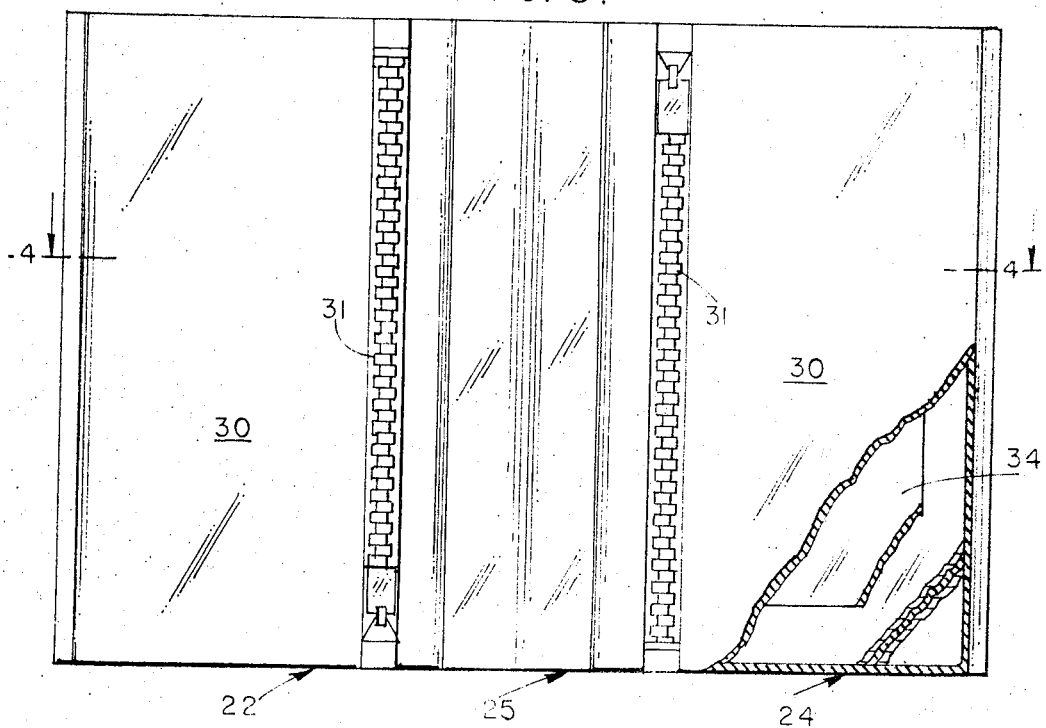
FIG. 3 illustrates a top-side plan view, partially fragmentary and in cross-section, of the wallet in an open condition.

Referring now to the drawings, and more particularly to FIGS. 1 and 2 thereof, the present invention relates generally to a wallet 20 having opposite outer composite panel segments 22 and 24 respectively, the latter segments 22 and 24 respectively being interconnected through the intermediary of a deformable transition portion 25 which permits movement of the segments relative to one another into and out of superposed relation. As illustrated in FIGS. 1 and 2, the wall is in a closed condition, wherein the segments 23 and 24 extend in superposed relation and are held in this closed condition by a strap 26 having similar opposite snap fastener buttons 28 detachably associated with snap fasteners (not shown) secured in a conventional manner to the exterior of the segments 22 and 24 respectively.

Each of the segments 22 and 24 respectively is provided with an upper opaque panel 30, each having respective zippers 31 for access to a transparent panel 32 over which may be positioned a sheet 34 provided with visual intelligence of alphabetical, numerical, symbolic or other matter, such as a photograph, pocket-watch, coin, dollar-bill, etc., this relationship being clarified below.

Figure 5:
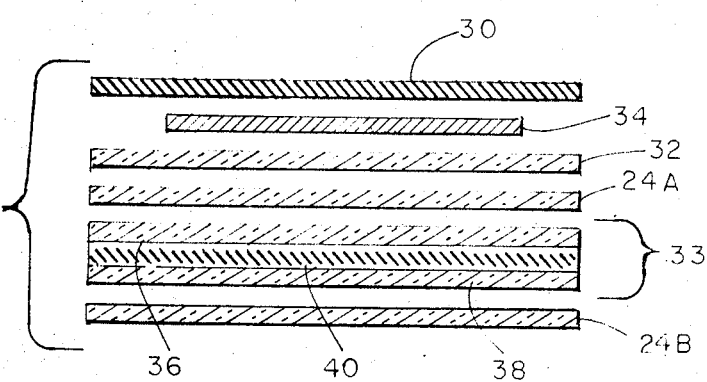
FIG. 5 illustrates an exploded perspective view of the relationship of certain of the panels pursuant to the wallet construction of the present invention.

Interposed between the transparent layers 24A and 24B of segment 24, which merge with transparent layers 22A and 22B of segment 22, is an intermediate composite panel 33, which is provided with an upper transparent sheet 36, a lower transparent sheet 38 and an intermediate sheet 40 having a louvered array of transparent and opaque zones extending in alternate succession in a manner generally illustrated in FIG. 5. The intermediate composite panel 33, provided in the segment 22, is generally identical to that of the composite panel 33 in the segment 24, with the exception, however, that interposed between the upper and lower transparent sheets 36 and 38 respectively, is a completely opaque sheet denoted by the reference character 40A in FIG. 4, the purpose of which opaque sheet 40A will be clarified below. Moreover, an opaque member 41 extends in the transition portion 25 to impart opacity thereto.

Expanding somewhat on the relationship of the intermediary composite panel 33, provided in the segment 24, the intermediate sheet 40, having the louvered array of transparent and opaque zones extending in alternate succession, is in fact commonly known as "light-control film," manufactured by the 3M Company, and constituted generally of cellulose acetate butyrate preferably, although polycarbonate or other suitable substance may be utilized likewise. The opaque zones are generally provided by forming laterally inclined slits in the intermediate sheet 40 and, thereafter, filling these slits with an opaque pigment. The inherent nature of the intermediate sheet 40 is to permit observation from one direction along one surface of the louvered arrangement, through the transparent zones, of visual intelligence positioned along an opposite surface of the louvered arrangement, yet prevent observation of the visual intelligence from a counter-direction along the first said surface. The significance of these features will be clarified below as related to the present invention. It is important, however, to clarify that the louvered arrangement can be provided in any other suitable form and structure so as to effect the relationship discussed above.

Figure 4:
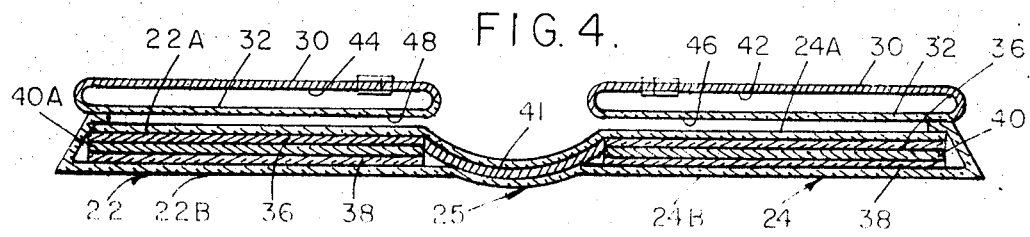
FIG. 4 illustrates a cross-sectional view taken along the line 4—4 in FIG. 3.
Figure 6:
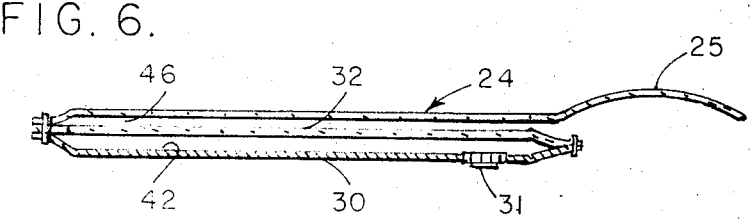
FIGS. 6–9 illustrate fragmentary cross-sectional views respectively of the sequence of utilizing the wallet pursuant to the present invention.
Figure 7:
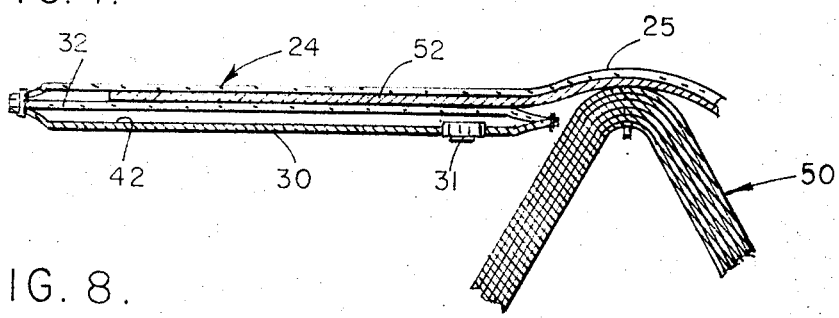
Figure 8:
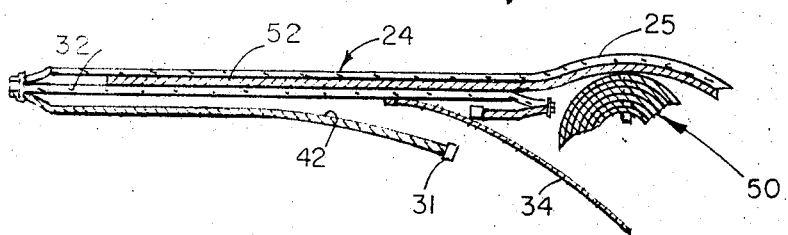
Figure 9:
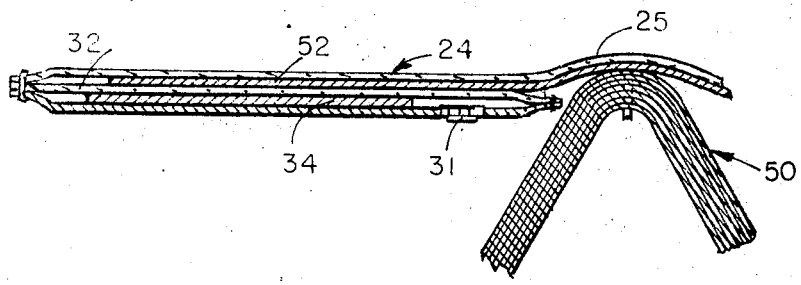

As illustrated in FIG. 4, the zipper 31 conceals a pocket 42, but permits access into the pocket 42 for inserting the sheet 34 upon which is provided visual intelligence. Similarly, a zippered pocket 44 is provided in the segment 22, wherein visual intelligence may be inserted likewise. The segments 24 and 22 respectively are likewise provided with additional pockets 46 and 48 respectively for permitting interpositioning of a book 50 (see FIGS. 6-9) between the segments 24 and 22 respectively and receiving respectively the opaque book binding-covers 52 respectively.

In the preferred form of the louvered arrangement, the intermediate sheet 40 should preferably have a thickness of approximately 0.015 inches, whereas the upper and lower transparent sheets 36 and 38 should each have a thickness of approximately 0.005 inches. Moreover, each of the pigmented opaque portions in the sheet 40 should be laterally inclined relative to the sheets 36 and 38 at an angle of approximately 23°, the opaque portions being laterally spaced from one another by approximately 0.010 inches.

In this respect, if the louvered sheet 40 were too thin, or substantially less than the thickness thereof aforementioned, then its capacity to prevent observation from one direction, the direction of arrow C in FIG. 2, would be greatly diminished; whereas if sheet 40 were too thick, or substantially greater than the thickness thereof aforementioned, the amount of refracted light transmission in the direction of arrow B in FIG. 2, would be insufficient to permit clear observation therethrough. Moreover, if the aforementioned lateral inclination of the opaque pigmented portions were at a greater angle than the aforementioned, it would permit observation therethrough over too large an arcuate range and, thereby, diminish the effectiveness of the louvers to conceal matter as required in the direction of arrow C.

As those skilled in the art will readily understand, the invention may be utilized for permitting simulation of mind-reading in a very simple and effective manner. In this respect, in order to perform a simulation of mind-reading or a simulated display of Extra-Sensory Perception, a subject is chosen who is unaware of the inherent features of the wallet 20. In order for even a novice magician, or "mentalist," to execute a display of mind-reading, a first step may be to permit the subject to examine the wallet 20 prior to insertion of the sheet 34 upon which is provided visual intelligence, as aforementioned, into the pocket 42. In this respect, when the subject examines or inspects the wallet 20, whether the subject holds the embodiment up to the light, or in any orientation, notwithstanding the extent of scrutiny utilized by the subject, upon his examination of the wallet, the entire wallet appears to be of completely opaque nature.

The reason for the completely opaque nature imparted to the wallet 20 is the fact that although there are transparent louvered zones, which are alternately spaced from one another successively, and although there are exposed the transparent outer segments 22 and 24 respectively, the opacity of the opaque panel 30 in the segment 24, will impart an opaque appearance to both the transparent louvered zones and the transparent segment 24, and will completely disguise and conceal the transparent nature of each of the transparent louvered zones universally from all directions. With regard to the segment 22, since the latter is provided with an opaque sheet 30, the transparency of the segment 22 will also be disguised and concealed.

Therefore, whether or not the book binding-covers 52 extend in the associated pockets therefor, 46 and 48 respectively, the entire wallet 20 will appear to be of opaque nature and, to the subject, nothing is visible through the panels in any direction. When the subject is properly convinced of the entire opacity of the wallet 20, the execution of a simulation of mind-reading may proceed.

Thereafter, the subject is instructed to write any information he so desires of visual nature on a sheet such as sheet 34, and insert the sheet 34 into very specifically the pocket 42 of the segment 24 so that, unbeknownst to him, the recorded information is exposed to or contacts the transparent panel 32. Thereafter, the subject is further instructed to close the zipper 31, all this occurring while the performer or so-called "mentalist" has his back turned to the subject, is blindfolded, or is out of the room so as to be prevented from observing what the subject has recorded.

Thereafter, the "mentalist" pulls the book 50 out of the pockets 46 and 48 therefor, and fastens the wallet 20 into a closed condition with the strap 26 so that the wallet 20 appears in a manner illustrated in FIGS. 1 and 2. While fastening the wallet 20, the "mentalist" glances at the segment 24, and because of the relationship of the louvered array of transparent and opaque zones, which extend longitudinally of the segment 24, the visual intelligence provided on the sheet 34, internally of the pocket 42, will be visible or observable by the person performing the simulated display of mind-reading in a direction along arrow B in FIG. 2, yet unobservable to the subject in a counter-direction or that direction indicated by the arrow C in FIG. 2. Clearly, it is important for the person performing the simulated display of mind-reading to maintain the orientation of the segment 24 so that the visual intelligence will appear only to the latter person and will not be observable by the subject in a direction of arrow C in FIG. 2.

Thereafter, the person performing the simulated display of mind-reading may place the wallet in his vest pocket, or the like, or for that matter in the pocket of the subject, to completely remove the wallet from the field of observation and may proceed to record the information he observed, such as the word "design" denoted in FIG. 2, on the note-pad or book 50 therefor or reveal the intelligence in any other dramatic manner. The subject is then told to open the wallet 20 and remove the sheet 34 upon which is provided the visual intelligence written by the subject. Care is taken to prevent the subject from viewing segment 24 from a direction of arrow B in that the wallet 20 is returned to the subject in a particular orientation.

After removal of the sheet 34, the person performing the simulated display of mind-reading, thereafter, reinserts the book 50 into the appropriate pockets 46 and 48 respectively therefor, and then shows the subject that the visual intelligence provided on the sheet 34 was exactly duplicated on one of the pages of the book 50. The subject may again, thereafter, wish to examine the wallet 20, however, since the binding covers 52 of the book 50 extend in the appropriate pockets 46 and 48 therefor, absolutely nothing is visible through the transparency of the segment 24. Should the subject wish to examine the wallet 20 without the book 50 therein, but with the sheet 34 therein, the subject is told to place the sheet 34 specifically into the pocket 44 in the segment 22, and since the intermediate sheet 40A is entirely opaque, the subject will not be able to observe the sheet 34 or the visual intelligence thereon.

In order to allow the subject to examine the wallet 20 without exposing the "MODUS OPERANDI," there being a distinction between the pockets 42 and 44 in the segments 24 and 22 respectively, the zippers 31 are arranged so as to open in opposing relation and, thus, the subject will not be permitted to determine whether or not the wallet 20 is in an upright condition so as to distinguish between his first insertion of the sheet 34 in the pocket 42, wherein the visual intelligence is observable only to the person performing the simulated display of mind-reading, and his second insertion of the sheet 34 specifically into the pocket 44 of the segment 22 wherein not even the person performing the simulated display of mind-reading can observe the visual intelligence. Again, in order to enhance the inability for distinguishing between the segments 22 and 24 respectively, the wallet 20 is provided with a single strap 26 having identical opposite end button snap fasteners 28 respectively.

It is also preferable to have all of the opaque elements in the wallet 20, such as the louvered opaque zones, the upper opaque panels 30 respectively and the opaque book binding-covers 52 respectively of identical color, including black. In this manner, anything that is transparent in the wallet 20 will always appear to be opaque because of the uniformly colored opaque elements which extend in superposed relation with the transparent elements.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A wallet for confining visual intelligence and permitting secret observation of the latter during confinement, said wallet including a pair of pockets for removably receiving opposite portions of a book binding-cover, and a pair of partially transparent pockets overlying the first said pockets respectively for receiving visual intelligence, one of the pockets for receiving an associated portion of the binding-cover including a louvered array of transparent and opaque zones extending in alternate succession for permitting limited observation of said visual intelligence when said book binding-cover is removed therefrom.

2. A wallet as claimed in claim 1 wherein said pockets which receive visual intelligence are each defined by an inner opaque sheet and a concealed transparent sheet.

3. A wallet as claimed in claim 2 wherein each said inner opaque sheet includes respective zippers.

4. A wallet as claimed in claim 3 wherein said zippers open in opposing relation.

5. A wallet as claimed in claim 2 wherein said pockets which receive associated portions of the book binding-cover are each defined by an outer composite panel segment and an associated one of said concealed transparent sheets.

6. A wallet as claimed in claim 5 wherein each outer composite panel segment is connected to the other through the intermediary of a deformable transition portion which permits movement of said segments relative to one another into and out of superposed relation.

7. A wallet as claimed in claim 6 wherein said transition portion includes a concealed opaque sheet.

8. A wallet as claimed in claim 6 wherein said louvered array of transparent and opaque zones is interposed in one of said composite panel segments, the other of said segments including an opaque sheet, each of said segments including a pair of transparent sheets between which are interposed the louvered array of the one segment and the opaque sheet of the other segment.

9. A wallet as claimed in claim 8 wherein said louvered array of transparent and opaque zones include a pair of transparent sheets and transparent cellulose acetate butyrate interposed between the latter pair of transparent sheets, said cellulose acetate butyrate being provided with laterally inclined slits filled with an opaque pigment.

10. A wallet as claimed in claim 9 wherein each of said segments have generally an identical transverse thickness.

* * * * *

UNITED STATES PATENT OFFICE
CERTIFICATE OF CORRECTION

Patent No. 3,744,541　　　　　　　　Dated July 10, 1973

Inventor(s) BRAUNHUT, HAROLD N.

It is certified that error appears in the above-identified patent and that said Letters Patent are hereby corrected as shown below:

On the cover sheet [19], "Brauhut" should read -- Braunhut -- ; and [76] "Harold N. Brauhut" should read -- Harold N. Braunhut -- .

Signed and sealed this 25th day of December 1973.

(SEAL)
Attest:

EDWARD M. FLETCHER,JR.　　　　　　RENE D. TEGTMEYER
Attesting Officer　　　　　　　　　Acting Commissioner of Patents